United States Patent [19]

Nishikawa et al.

[11] Patent Number: 4,730,520
[45] Date of Patent: Mar. 15, 1988

[54] CONTROL SYSTEM FOR ENGINE-DRIVEN AUXILLARY EQUIPMENT FOR VEHICLES

[75] Inventors: Masao Nishikawa, Tokyo; Junichi Miyake, Saitama; Yoshimi Sakurai, Tokyo, all of Japan

[73] Assignee: Honda Giken Kogyo Kabushiki Kaisha, Tokyo, Japan

[21] Appl. No.: 82,924

[22] Filed: Aug. 5, 1987

Related U.S. Application Data

[63] Continuation of Ser. No. 802,501, Nov. 27, 1985, Pat. No. 4,658,943.

[30] Foreign Application Priority Data

Nov. 28, 1984 [JP] Japan .................................. 59-251332

[51] Int. Cl.⁴ .............................................. B60K 41/18
[52] U.S. Cl. ..................................... 74/866; 192/3.31; 62/243
[58] Field of Search .......................... 74/866, 856, 878; 192/3.31, 3.58, 0.052, 0.032, 0.092; 62/323.4, 158, 243

[56] References Cited

U.S. PATENT DOCUMENTS

| | | | |
|---|---|---|---|
| 3,710,587 | 1/1973 | Hayashi | 62/243 X |
| 4,377,226 | 3/1983 | Chevalier et al. | 192/3.31 X |
| 4,386,687 | 6/1983 | Chevalier et al. | 192/3.31 X |
| 4,391,242 | 7/1983 | Mashio | 62/323.4 X |
| 4,425,766 | 1/1984 | Claypole | 62/133 |
| 4,428,467 | 1/1984 | Hiramatsu | 74/752 A X |
| 4,476,970 | 10/1984 | Ito | 192/0.052 |
| 4,485,443 | 11/1984 | Knodler et al. | 74/861 X |
| 4,487,029 | 12/1984 | Hidaka et al. | 62/323.4 X |
| 4,523,281 | 6/1985 | Noda et al. | 364/424.1 |
| 4,545,213 | 10/1985 | Fujiwara et al. | 62/158 |
| 4,556,942 | 12/1985 | Russo et al. | 364/431.7 |

FOREIGN PATENT DOCUMENTS

| | | | |
|---|---|---|---|
| 56-39354 | 4/1981 | Japan . | |
| 33514 | 2/1983 | Japan | 62/243 |
| 78823 | 5/1983 | Japan | 62/243 |
| 211915 | 12/1983 | Japan | 62/243 |
| 106314 | 6/1984 | Japan | 62/243 |

*Primary Examiner*—Dirk Wright
*Attorney, Agent, or Firm*—Armstrong, Nikaido, Marmelstein & Kubovcik

[57] ABSTRACT

A control system (100) for an engine-driven auxiliary equipment (51) for a vehicle equipped with an automatic transmission (10) including a fluid coupling type torque converter (2) receiving power from an engine (1) to drive a driven wheel. The control system (100) is adapted to interrupt power from the engine (1) to the auxiliary equipment (51) under a condition that an instantaneous value ($e_d$) of a gear ratio (e) as the quotient of a rotation speed (No) of an output shaft (3) of the torque converter (2) to a rotation speed (Ni) of an input shaft (2a) of the torque converter (2) is lying in a region ($e_d < e_c$, $e_1$, $e_2$) corresponding to a state of torque amplification of the torque converter (2) where a predetermined value is exceeded.

4 Claims, 7 Drawing Figures

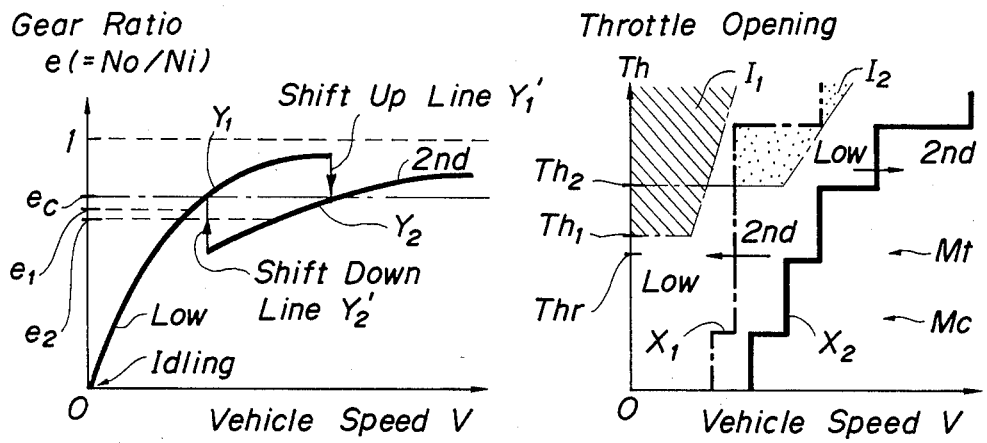
FIG. 3
FIG. 4
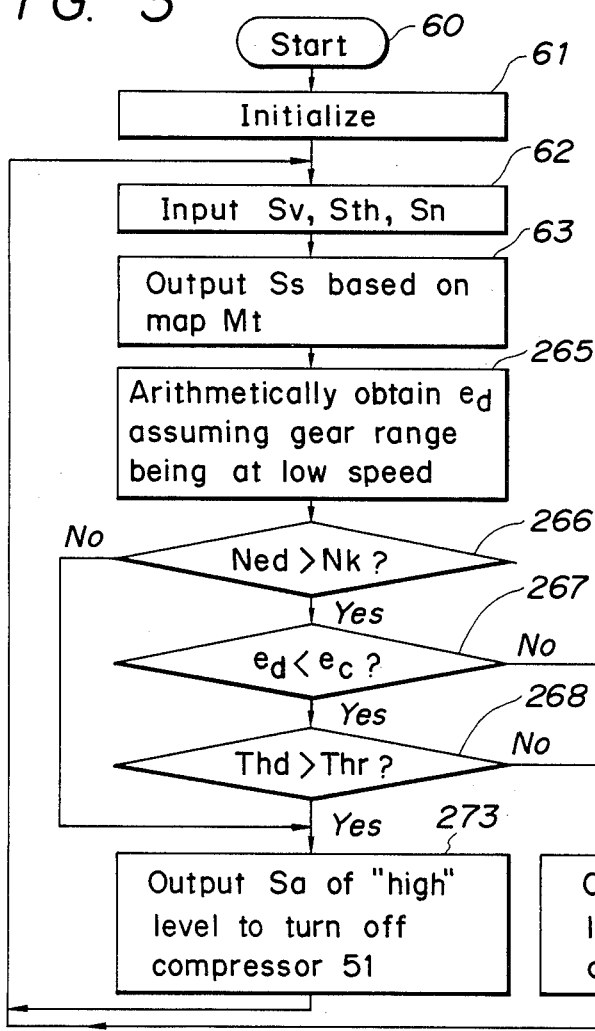
FIG. 7

CONTROL SYSTEM FOR ENGINE-DRIVEN AUXILLARY EQUIPMENT FOR VEHICLES

This is a continuation of application Ser. No. 802,501, filed Nov. 27, 1985, now U.S. Pat. No. 4,658,943.

BACKGROUND OF THE INVENTION

1. Field of the Invention

The present invention generally relates to a control system for auxiliary equipments for vehicles. More particularly, the invention relates to a control system for an auxiliary equipment for vehicles that is driven by engine power.

2. Description of Relevant Art

There are known varieties of control systems of the type which is to control, in conjunction with the accelerating condition of an engine, an auxiliary equipment for vehicles that is driven by the engine, such as a compressor of an air conditioner for cooling use.

Exemplarily, in Japanese Patent Publication No. 47-10721, published on Mar. 31, 1972, there is disclosed a control system which permits a part of engine power to be supplied to a compressor of an air conditioner for cooling use of a vehicle under either a condition that an acceleration pedal is depressed, exceeding a predetermined depressed quantity, or another condition that an intake pipe for a carburetor has a negative inner pressure attendant such as on a travelling of the vehicle on a downward slope.

For vehicles with such a control system, however, when operating the cooling-oriented air conditioner, which in general consumes much energy for operation, if the operating energy thereof is supplied from an engine that is limited in the capacity of energy output, the engine power available, as it is inherently intended, for propelling the vehicle is decreased by as much quantity as for the operation of the air conditioner, so that the capacity of acceleration is lowered.

For such a reason, there has since before been a demand that preferably, by detecting the accelerating condition of a vehicle, control should be made to stop the operation of the compressor, and there have already been proposed a variety of systems to realize such demand.

For example, in Japanese Utility Model Publication No. 51-41315, published on Oct. 7, 1976, there is disclosed a control system which, detecting the depressed quantity of an acceleration pedal and the number of revolutions per minute of an engine, controls a power distribution from the engine to a compressor for cooling use, so as to interrupt the distribution unless the engine revolution number is increased in accordance with the depressed pedal quantity.

In vehicles of the type which is equipped with an automatic transmission including a fluid coupling as a torque converter and furnished with a cooling-oriented air conditioner, the air conditioner generally has a compressor thereof driven with power sent from an engine through a mechanical power transmission route separated from a route to the automatic transmission, while the engine as a power source has nothing but a single crankshaft that outputs engine power available for both the compressor and the torque converter.

In this concern, driving energy given to the compressor is directly proportional to the revolution number of an input shaft of the compressor.

On the other hand, in the vicinity of a stalling point, the efficiency of power transmission of the fluid coupling is very bad and nearly equal to 0%, while in general the torque converter to be employed in an automatic transmission for vehicles has a relatively high revolution number at the stalling point, so that the energy to be consumed at the compressor when starting the vehicle is relatively large in comparison with the case of vehicles equipped with a manual transmission including no fluid coupling.

Therefore, in vehicles equipped with an automatic transmission including a fluid coupling as a torque converter, at the start, if a compressor of an air conditioner for cooling use has already been driven with power from an engine, the capacity of starting acceleration of the vehicle is all the more lowered when compared with the case of vehicles equipped with a manual transmission including no fluid coupling.

In other words, for vehicles equipped with an automatic transmission including a fluid coupling as a torque converter, the use of a cooling-oriented air conditioner accompanies a problem that the capacity of acceleration drops, particularly when starting the vehicle.

In such a case, therefore, it is first of all desired to accurately detect the state of starting acceleration of vehicle to thereby conduct shutdown control of a compressor and, besides, it would be preferred, as more rational if possible, to stop operation of the compressor, also when accelerating the vehicle to pass ahead, in accordance with the state of acceleration.

Most of the automatic transmissions as described are electronically controlled in view of the possibility of enlarging the freedom in setting operational characteristics as well as facilitations in securing the accuracy. Generally, the electronic control type automatic transmission includes a shift map developed on a coordinate plane with axes of abscissa and ordinate representing the velocity of a vehicle (hereinafter called "vehicle speed V") and exemplarily the degree of the opening of throttle valve (hereinafter called "throttle opening Th"), respectively.

The present invention has been achieved to successfully substantiate such desideratum as described in conjunction with conventional control systems for engine-driven auxiliary equipments such as air conditioners for cooling use for vehicles. Particularly, it is achieved with an eye to the fact that such desideratum is noticeable in those vehicles which includes an electronic control type automatic transmission having a fluid coupling as a torque converter, and that in general a shift map is utilized in the automatic transmission.

SUMMARY OF THE INVENTION

Accordingly, an object of the present invention is to provide a control system for an engine-driven auxiliary equipment for vehicles which, when employed in a vehicle, particularly in such a vehicle as equipped with an automatic transmission having a fluid coupling as a torque converter, the capacity of acceleration in starting, as well as that in passing ahead, to be maintained as it is inherently intended.

To achieve such an object, the present invention provides a control system for an engine-driven auxiliary equipment for a vehicle including an engine, and an automatic transmission receiving power from the engine to drive a driven wheel. The automatic transmission consists of a torque converter of a fluid coupling type having an input shaft thereof at the engine side and an output shaft thereof at the driven wheel said. The equipment is driven with power from the engine. A transmitting-and-interrupting means transmits and interrupts the power from the engine to the auxiliary equipment. The control system controls the transmitting-and-interrupting means to thereby control the auxiliary equipment. The control system comprises a first means for determining an instantaneous value of a gear ratio in terms of a rotation speed of the output shaft at the driven wheel side of the torque converter divided by a rotation speed of the input shaft at the engine side thereof. A second means cuts the transmitting-and-interrupting means to thereby interrupt the power from the engine to the auxiliary equipment under a condition that the instantaneous value of the gear ratio as thus determined of the torque converter is lying in a region corresponding to a state of torque amplification of the torque converter where a predetermined value is exceeded.

The above and further features, objects and advantages of the present invention will more fully appear from the following detailed description of a preferred embodiment of the invention and modified examples thereof when they are read in conjunction with the accompanying drawings.

BRIEF DESCRIPTION OF THE DRAWINGS

In the drawings:

FIG. 3 is a graph showing the relation between the vehicle speed V of the vehicle and a gear ratio of a torque converter of the automatic transmission;

FIG. 4 is a shift map that the automatic transmission is inherently provided with;

FIG. 7 is a flow chart showing the content of control actions according to a second modified example of the control system.

DETAILED DESCRIPTION OF THE PREFERRED EMBODIMENT

Figure 1:
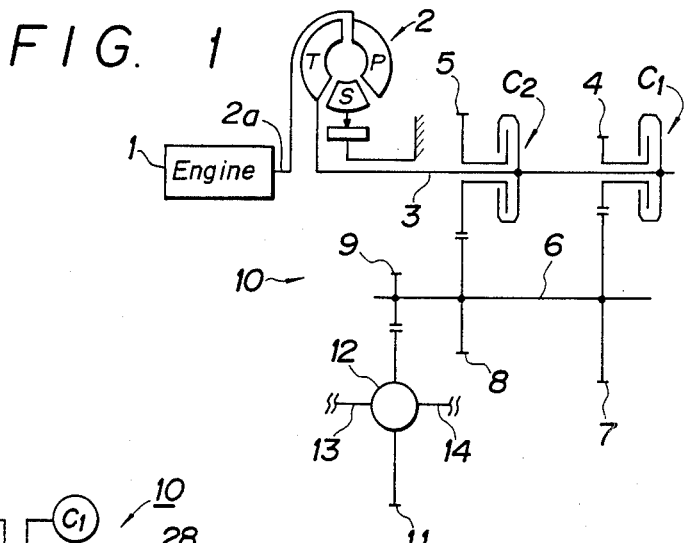
FIG. 1 is a power train diagram of a torque converter type automatic transmission of a vehicle which has applied thereto, for an air conditioner as a vehicle-oriented auxiliary equipment furnished therein to be driven by an engine, a control system according to a preferred embodiment of the present invention.

Referring first to FIG. 1, designated at reference numeral 10 is the entirety of a torque converting automatic transmission of electronic shift control type equipped in a vehicle that is furnished with an air conditioner as an auxiliary equipment for vehicles that is driven with power from an engine 1, the air conditioner having a later-described drive circuit thereof put under control of a later-described control system according to a preferred embodiment of the present invention. For the simplicity of description, the automatic transmission 10 is embodied as of a two-speed type having a pair of mutually shiftable forward speeds called "first" or "low" and "second", respectively, while it further has a reverse power train omitted from the drawings.

The engine 1 has power thereof transmitted as output torque therefrom to a pump P of a torque converter 2, where it is fluid-mechanically converted as torque at a turbine T, as it is amplified between the pump P and the turbine T, while the reaction thereto is born by a stator S.

The turbine T is connected to a mainshaft 3, which has a low-speed oriented clutch $C_1$ and a high-speed oriented clutch $C_2$ integrally operatively fixed thereon, respectively, and a low-speed drive gear 4 and a high-speed drive gear 5 free-rotatably loose-fitted thereon, respectively. The clutches $C_1$, $C_2$ are to be either, as it is selected through the function of the control system, forced into connection with a corresponding one of the gears 4, 5, so that the gear 4 or 5 at the selected side becomes integrally rotatable with the mainshaft 3. On the other hand, on a countershaft 6 arranged in parallel with the mainshaft 3, there are fixed integrally therewith a low-speed and a high-speed driven gears 7, 8 meshing with the drive gears 4, 5, respectively, as well as a final gear 9 meshing with a ring gear 11 of a differential 12, which has side axles 13, 14 thereof to drive left and right drive wheels (not shown) of the vehicle.

In the automatic transmission 10 with such an arrangement, when the low-speed clutch $C_1$ is forced into connection while releasing or disconnecting the high-speed clutch $C_2$, a gear ratio is established across a train of the gears 4, 7 for the first or low speed. To the contrary, when the high-speed clutch $C_2$ is forced into connection while releasing the low-speed clutch $C_1$, there is established another gear ratio across a train of the gears 5, 8 for the second speed.

Figure 2:
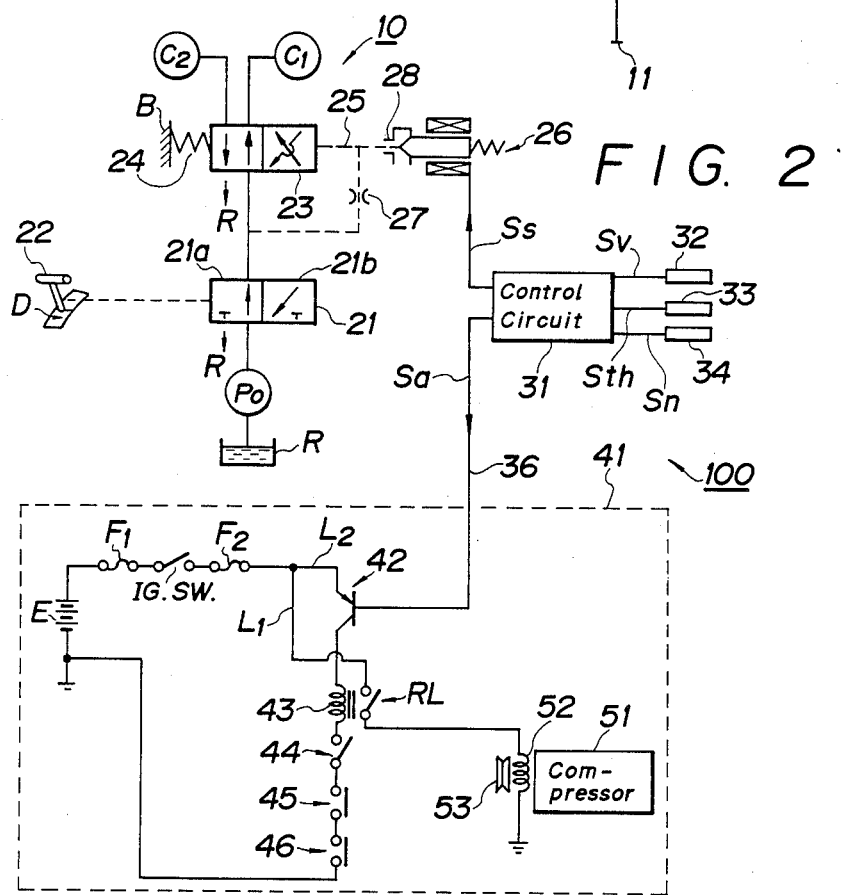
FIG. 2 is a diagram of a control circuit of the control system according to the embodiment, which is applied to control the air conditioner as described and the automatic transmission of the vehicle.

Referring now to FIG. 2, designated by reference numeral 100 is the entirety of the control system according to the present invention, which effects shift control of the transmission 10 by bringing the clutches $C_1$, $C_2$ into connection or disconnection, as circumstances require, as well as controls the operation of the air conditioner including a compressor 51, which operation control is effected by the aid of an electric circuit 41 in the conditioner as the air aforesaid drive circuit therefor.

As shown in FIG. 2, the transmission 10 has a hydraulic circuit including a hydraulic source Po constituted with an oil pump to be driven with power from the engine 1 to pump up hydraulic oil to be fed from an oil reservoir R to the clutch $C_1$ or $C_2$, as required.

The hydraulic oil as pressurized at the hydraulic source Po is sent to a speed selection valve 21, which has a supply path 21a to interconnect the hydraulic source Po with a shift valve 23 when a shift lever 22 is put in a forward position D thereof as illustrated in FIG. 2. The shift valve 23 is normally urged as a poppet toward a working position thereof intended for low-speed use, as shown in FIG. 2, with a spring 24 fixed at a vehicle body end B thereof, while there is provided a pilot path 25 that is controlled, by means of a solenoid valve 26, to supply a hydraulic pressure, when necessary, for urging the shift valve 23 toward another working position thereof intended for high-speed use.

When the solenoid valve 26 is put in an excited position thereof as shown in FIG. 2, the pilot path 25 has a reduced hydraulic pressure, by the resistance across an orifice 27, to be substantially maintained at a zero pressure level, so that the shift valve 23 is kept at the low-speed position. To the contrary, when the solenoid valve 26 is de-energized into a calm or de-excited position thereof, thereby closing a delivery nozzle 28 thereof, the spring 24 has the strength of resiliency thereof set so as to bring the shift valve 23 into the high-speed position.

When the shift valve 23 is in the low-speed position, as shown in FIG. 2, the hydraulic source Po is connected to the low-speed clutch $C_1$, establishing the gear ratio across the train for the first or low speed, while the high-speed clutch $C_2$ is connected to the oil reservoir R. To the contrary, when the shift valve 23 is brought to the left in FIG. 2 into the high-speed position, the hydraulic source Po is connected to the high-speed clutch $C_2$, establishing the gear ratio across the train for the second speed, while the low-speed clutch $C_1$ is connected to the oil reservoir R.

In the automatic transmission 10 with such hydraulic circuitry, the speed selection valve 21 is to move, exemplarily when the shift lever 22 is operated into a neutral range thereof (not shown), to the left in FIG. 2 to have a return path 21b thereof inserted between a hydraulic line at the clutch side and the oil reservoir R, thereby returning hydraulic oil from the former to the latter.

The action of the solenoid valve 26 is controlled with an excitation control signal Ss sent from a central electronic control circuit 31 which includes necessary circuit elements (not shown) such as a signal processor and a memory cooperating therewith.

The electronic control circuit 31 has input thereto an output singnal from a vehicle speed detector 32 to detect the velocity of the vehicle, herein called "vehicle speed V", which signal is given as an electric signal, named "vehicle speed signal Sv", representing an instantaneous value Vd of the vehicle speed V as detected, and another output signal from a throttle opening detector 33 to detect the degree of opening of a throttle (not shown) of the engine 1, herein called "throttle opening Th", which signal also is given as an electric signal, named "throttle opening signal Sth", representing an instantaneous value Thd of the throttle opening Th as detected.

With the vehicle speed signal Sv and the throttle opening signal Sth input, the control circuit 31 is to determine, on a later-described shift map that is accessibly stored in the memory and constructed to be identifiable of the coordinate of any point thereon in combination with a pair of parameters given in terms of the instantaneous values Vd, Thd of the vehicle speed V and the throttle opening Th as determined from the signals Sv and Sth respectively, where or in which zone the point as identified by the parameters Vd, Thd is located, and to control the open-close actions of the solenoid valve 26 in accordance with the result of the determination.

In FIG. 2, designated at reference numeral 34 is an engine revolution number detector for detecting the number of revolutions per minute of the engine 1, hereinafter called "engine revolution number Ne", to output therefrom an electric signal representing an instantaneous value Ned of the engine revolution number Ne as detected, named "engine revolution number signal Sn", which signal Sn also is sent to the control circuit 31.

Moreover, also the shift range as a current position of the shift lever 22 is detected by means of a detector (not shown) to provide a shift range signal to be sent to the control circuit 31.

Referring now to FIG. 3, designated at reference character e ($=No/Ni$) is a gear ratio or rotational speed ratio across the torque converter 2 of the automatic transmission 10. The ratio is defined as the quotient of a rotation speed No in terms of the number of revolutions per minute of the mainshaft 3 as an output shaft of the converter 2 with respect to a rotation speed Ni in terms of the number of revolutions per minute of an input shaft 2a (FIG. 1) of the converter 2. In the automatic transmission 10, the gear ratio or rotational speed ratio e of the torque converter 2 has such a relation to the vehicle speed V of the vehicle as illustrated by characteristic curves in the graph of FIG. 3, the curves showing like tendency to the case of torque converters of ordinarily employed automatic transmissions.

In the graph of FIG. 3, the abscissa represents the vehicle speed V of the vehicle, and the ordinate, the gear ratio or rotational speed ratio e of the torque converter 2. Plotted by curves $Y_1$ and $Y_2$ are those values of the gear ratio or rotational speed ratio e to be established as the vehicle speed V is varied, with the shift lever 22 put in a low and a second ranges thereof, respectively $Y_1$, and $Y_2$, are shift-up and shift-down lines along which the gear ratio or rotational speed ratio e changes as the shift lever 22 is moved from the low to the second range and from the second to the low range, respectively. Identified by $e_c$ is a gear ratio, called a coupling point, that defines a fluid coupling region, where $e \leq e_c$ and the torque converter 2 is substantially kept from amplifying or multiplying torque, and a torque converting region, where $e < e_c$ and the torque converter 2 makes the amplification or multiplication of torque.

Although the torque converting region, where $e < e_c$, generally corresponds to a region of acceleration, it covers also such a point that $e = 0$ and $V = 0$, where the vehicle may exemplarily be in a stopped state, while idling, and thus not be in an accelerating state. In this respect, to define the accelerating state of the vehicle, there is employed such a sufficient condition to be satisfied that the instantaneous value Thd of the throttle opening Th should exceed a reference value Thr preset therefore, in addition to the necessary condition that $e_d < e_c$, where $e_d$ is an arbitrary instantaneous value of the gear ratio or rotational speed ratio e as determined in a later-described manner.

In this concern, for the compressor 51, the setting of later-described operation prohibition regions may be made optimum by selecting proper values of the gear ratio or rotational speed ratio e and the throttle opening Th, that are near or equal to $e_c$ and Thr, respectively, as those gear ratios $e_1$, $e_2$ and throttle openings $Th_1$, $Th_2$, respectively, to be given as boundary conditions for stopping the operation of the compressor 51 in the accelerating state of the vehicle.

In compliance with the automatic transmission 10 having gear ranges thereof mutually shiftable with a hysteresis put therebetween as described below, also the gear ratio e of the torque converter 2 has a hysteresis attendant on shift operations as shown in FIG. 3.

Referring now to FIG. 4, designated by reference character Mt is the shift map of the control circuit 31. The map Mt is used for the circuit 31 to control the solenoid valve 26.

In this respect, in FIG. 4, the shift map Mt is shown as it has overlapped thereon a control map Mc including the operation prohibition regions $I_1$, $I_2$ for use in operation control of the compressor 51. Moreover, the critical values $Th_1$, $Th_2$ of the throttle opening Th with respect to the prohibition regions $I_1$, $I_2$ are set in the vicinity of the reference value Thr, as described.

In FIG. 4, with respect to the shift map Mt, defined by solid line $X_2$ is the boundary, as it is set to pass in shift-up operations from the low to the second range of the shift lever 22, that is, from a zone of a gear range named "low" on the map Mt to another zone of a gear range named "second" thereon, and chain line $X_1$ is the boundary, as it is set to pass in shift-down operations from the second to the low range of the shift lever 22, that is, from the second to the low gear range zone on the map Mt. The zone defined between the shift-down line $X_1$ and the shift-up line $X_2$ is what is called "hysteresis", which is a zone preset for the purpose of preventing damage the automatic transmission 10.

The electronic control circuit 31 controls the shifting of the automatic transmission 10 in conformity with the shift map Mt and in accordance with the vehicle speed signal Sv and the throttle opening signal Sth, as described, and also feeds a control signal Sa (FIG. 2) to the conditioner circuit 41, thereby controlling the operation of the compressor 51, in conformity with the control map Mc and in accordance with the engine revolution number signal Sn and current gear range as well as the signals Sv, Sth, as will be detailed later.

More particularly, with the control map Mc, the control circuit 31 is such that, when a parameter as the instantaneous value $e_d$ of the gear ratio e is determined to be lying in the range of a later-described region, the control signal Sa as set at a "high" level is output through an electric line 36 (FIG. 2), thereby stopping operation of the compressor 51. On the other hand, when the parameter $e_d$ and another parameter as the instantaneous value Thd of the throttle opening Th are determined not to be lying in the range of later-described regions, the signal Sa as set at a "low" level is output, thereby permitting the compressor 51 to be put in operation.

There will be described below the constitution of the conditioner circuit 41 as a drive circuit for the cooling-oriented air conditioner that includes the compressor 51, which circuit 41 is put under control of the control circuit 31.

As shown in FIG. 2, the conditioner circuit 41 employs as its electric source a vehicle-mounted battery E, which has at the positive pole side thereof a supply line including a main fuse $F_1$, an ignition switch IG.SW., and a conditioner circuit fuse $F_2$, before reaching a node where it is branched to have a pair of branch lines $L_1$, $L_2$. One branch line $L_1$ is connected, through a relay switch RL, to an exciting coil 52 of an electromagnetic clutch (not shown) to couple a pulley 53, which is driven with power from the engine 1, with the compressor 51, and grounded thereafter. The other branch line $L_2$ is connected, through a pnp transistor 42, to an exciting coil 43 of the relay switch RL, and ground via a manual switch 44 for on-off operation of the air conditioner, a temperature-sensitive limit switch 45, and a pressure-sensitive limit switch 46. The temperature switch 45, located at an outlet (not shown) for blowing cold air of the air conditioner, is to close when the temperature of the air blown is raised higher than a predetermined temperature level, while it is opened with temperatures below the predetermined level. The pressure switch 46 is to close when the gas pressure of a coolant of the air conditioner is caused to fall below a predetermined pressure level, while it is opened with gas pressures above the predetermined level.

In the foregoing control system 100, under the condition that the switches IG.SW and 44 to 46 of the branch line $L_2$ are all closed, if the control signal Sa is at the "low" level, the coil 43 of the relay switch RL is energized, exciting to close the relay switch RL, so that also the coil 52 of the electromagnetic clutch is energized, exciting the clutch to couple the pulley 53 with the compressor 51. As a result, the compressor 51 is driven to start an air cooling cycle of the air conditioner.

In FIG. 2, although the electric power line of the control system 100 is illustrated for no more than the conditioner circuit 41, it is supposed that electric power is supplied from the battery E to the entire system including the control circuit 31, when the igntion switch IG.SW. is turned on.

There will be simply described below the way how to obtain the instantaneous values Vd, Thd, $e_d$ of the vehicle speed V, the throttle opening Th, and the gear ratio e from the output signals Sv, Sth, Sn of the detectors 32, 33, 34, as they are available for signal processes in the control circuit 31.

The instantaneous vehicle speed Vd and the instantaneous throttle opening Thd are directly determined in accordance with the contents of the vehicle speed signal Sv and the throttle opening signal Sth, respectively.

Where the shift lever 22 is put exemplarily in the range D as described, the current gear range of the automatic transmission 10 is determined to be low or second, depending on the thus determined instantaneous vehicle speed Vd and throttle opening Thd, in compliance with the shift map Mt.

The instantaneous gear ratio $e_d$ is defined as described, such that:

$$e_d = No/Ni \tag{1}$$

In the right-hand side of expression (1) above, the denominator Ni is the number of revolutions per minute of the input shaft 2a of the torque converter 2 and equivalent to the engine revolution number Ne, is directly determined from the content of the output signal Sn of the engine revolution number detector 34.

On the other hand, the numerator No is the number of revolutions per minute of the output shaft 3 of the torque converter 2, is determined from the instantaneous vehicle speed Vd and the current gear range of the transmission 10, by means of a given operation, whereas, for each case of the current gear range to be low or second, an apparent gear ratio of a power train from the output shaft 3 of the torque converter 2 to the drive wheels is given as known data. In this respect, the instantaneous vehicle speed Vd as well as the current gear range is already obtained as described.

As simply described before, the control circuit 31 fundamentally is to stop the compressor 51, if the current gear range of the automatic transmission 10 is low, under the condition that the instantaneous value $e_d$ of the gear ratio e across the torque converter 2 is below the given value $e_1$ as a first predetermined gear ratio thereacross. If the current gear range of the transmission 10 is second, under the condition that the instantaneous gear ratio $e_d$ across the torque converter 2 is below the given value $e_2$ as a second predetermined gear ratio thereacross.

Figure 5:
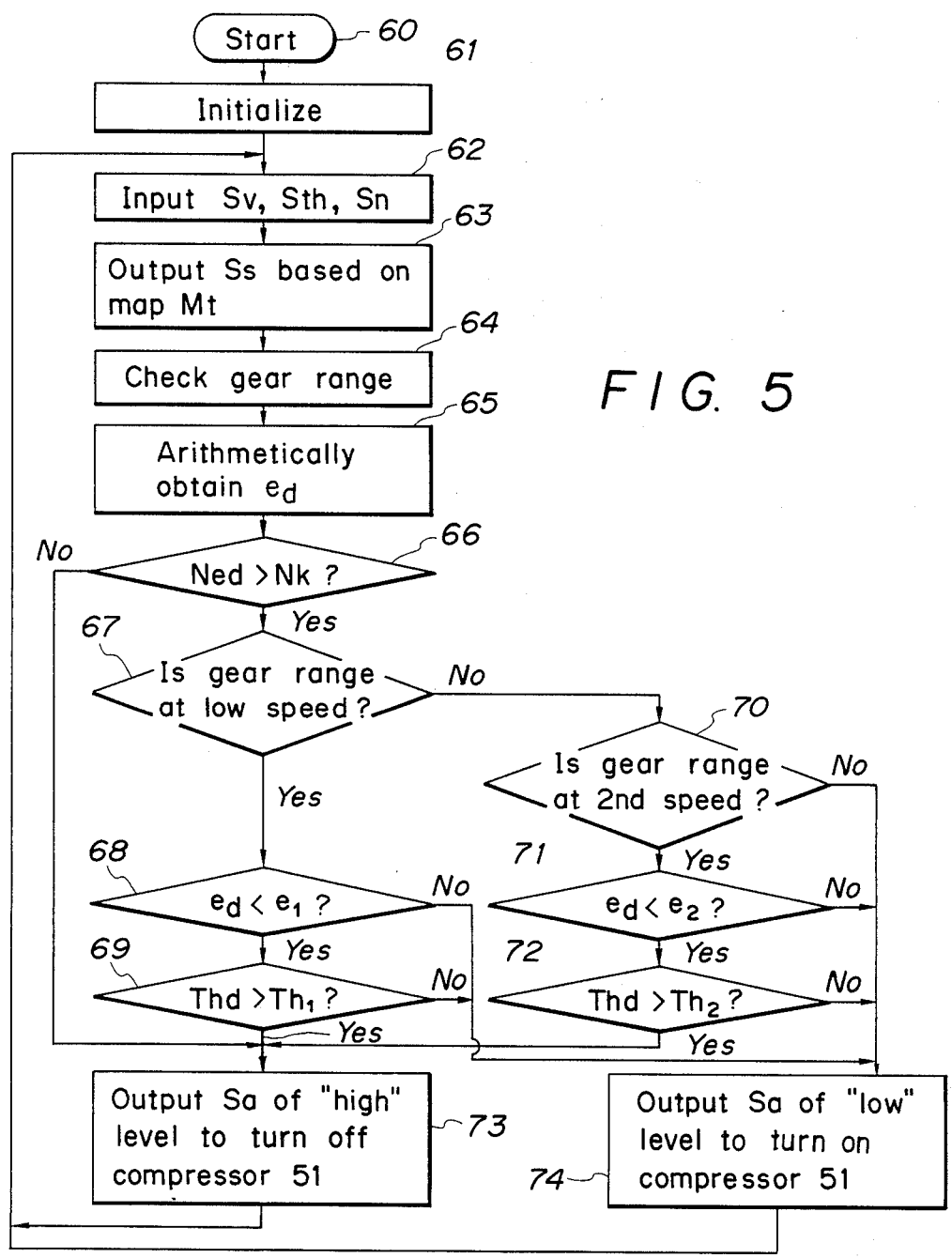
FIG. 5 is a flow chart showing the content of control actions of the control system according to the embodiment.

Referring now to FIG. 5, there will be described below the content of a sequence of control actions of the control system 100 along with a flow chart shown in the drawing.

The control sequence of the system 100 has a flow thereof to start, when the ignition switch IG.SW. is turned on, at a step 60.

At a step 61, associated parameters are all set to initial values thereof, and all elements put under control of the control circuit 31 are all initialized.

At a step 62, the vehicle speed signal Sv from the vehicle speed detector 32, the throttle opening signal Sth from the throttle opening detector 33, and the engine revolution number signal Sn from the engine revolution number detector 34 are read in to determine the respective instantaneous values Vd, Thd, Ned of the vehicle speed V, the throttle opening Th, and the engine revolution number Ne to be all stored and utilized as real time values of the corresponding parameters. Moreover, at step 62, the current set range of the shift lever 22 is determined to be low or second and is stored.

At step 63, which is a step to control the gear range (low, second, etc.) of the automatic transmission 10, the control signal Ss for operating the solenoid valve 26 is output thereto with necessary information to establish the gear ratio of the low or second forward speed, as required, based on the shift map Mt and in accordance with the instantaneous values Vd, Thd of the vehicle speed V and the throttle opening Th as read at step 62, and the current gear range to be low or second is stored.

Also in the case where the shift lever 22 is not put in the range D, a necessary process for determining the current range thereof is performed at step 63, whereas further description will not be given herein.

Upon completion of process at step 63, the program flow goes to a loop consisting of steps 64 to 74 for controlling the conditioner circuit 41.

In this loop, first, at the step 64, the current gear range of the automatic transmission 10 is checked to be low or second, based on the gear range stored at the step 63.

In this respect, in the case where the shift lever 22 is put in the neutral range N, there is selected, as the current gear ratio of the power train from the output shaft 3 of the torque converter 2 to the drive wheels, a gear ratio of low range to be utilized at the next step 65.

At the step 65, the instantaneous value $e_d$ of the gear ratio e across the torque converter 2 is computed in such a manner as described, by use of the instantaneous engine revolution number Ned and the instantaneous vehicle speed Vd stored at the step 62 as well as such current gear ratio of the power train from the output shaft 3 to the drive wheels as computed at the step 64.

Then, at the step 66, it is determined whether or not the instantaneous value Ned of the engine revolution number Ne is larger than a reference rotation speed, that is, an idling speed Nk in terms of the number of revolutions per minute of the engine 1. If Ned is not higher than Nk, the program flow goes to the step 73, under the determination that an engine stop state is prevailed.

At the step 73, the control signal Sa as set at the "high" level is output through the line 36 to turn off the compressor 51.

If, at step 66, Ned is determined to be larger than Nk, the program flow goes to step 67.

At step 67, it is determined whether or not the current gear range of the automatic transmission 10 as stored at step 63 is low, that is, whether it is at the side of the zone of the low speed or not.

If the current gear range is determined to be low at step 67, the program flow goes to step 68, 69, where it is determined whether or not the instantaneous gear ratio $e_d$ is smaller than the first predetermined gear ratio $e_1$ and whether or not the instantaneous throttle opening Thd is larger than the given value $Th_1$ as a first reference opening shown in FIG. 4, respectively. If both conditions are satisfied, the program flow goes to step 73 to turn off the compressor 51.

If, at step 68, the instantaneous gear ratio $e_d$ is determined not to be smaller than the first predetermined gear ratio $e_1$ or if, at step 69, the instantaneous throttle opening Thd is determined not to be larger than the first reference opening $Th_1$, the program flow goes to step 74.

At step 74, the control signal Sa as set at the "low" level is output through the line 36 to turn on the compressor 51.

If, at step 67, the current gear range of the automatic transmission 10 is determined not to be low, the program flow goes to step 70.

At step 70, it is determined whether or not the current gear range of the automatic transmission 10 is second. If the current gear range is second, the program second, the flow goes to steps 71, 72, where it is determined whether or not the instantaneous gear ratio $e_d$ is smaller than the second predetermined gear ratio $e_2$ and whether or not the instantaneous throttle opening Thd is larger than the given value $Th_2$ as a second reference opening shown in FIG. 4, respectively. If both conditions are satisfied, the program flow goes to step 73 to turn off the compressor 51.

If, at step 71, the instantaneous gear ratio $e_d$ is determined not to be smaller than the second predetermined gear ratio $e_2$ or if, the step 72, the instantaneous throttle opening Thd is determined not to be larger than the second reference opening $Th_2$, the program flow goes to step 74 to turn on the compressor 51.

Upon completion of step 73 or 74, the program flow goes to step 62.

In the foregoing control sequence, the flow goes from step 70 directly to step 74 under the program condition that the current gear range of the automatic transmission 10 is neither low nor second, which exemplarily corresponds to a gear ratio of the neutral range N.

Further, while the gear ratio e is varying within a range of the curve $Y_1$ where $e < e_1$ in FIG. 3, associated coordinates (V, Th) on the control map Mc of FIG. 4 to be defined by the parameters of the vehicle speed V and the throttle opening Th are located within the prohibition region $I_1$ with respect to the operation of the compressor 51. Likewise, while the gear ratio e is varying within a range of the curve $Y_2$ where $e < e_2$ in FIG. 3, the coordinate (V, Th) on the control map Mc of FIG. 4 is lying within the prohibition region $I_2$.

It will thus be comprehended that the prohibition region $I_1$ on the control map Mc of FIG. 4 is a region where the current gear range of the automatic transmission is low and that the prohibition region $I_2$ is a region where the current gear range is second.

In the flow chart of FIG. 5, when the program flow comes to step 74, there is satisfied a condition for permitting the compressor 51 to be put in operation. In this respect, by means of a software timer for example, which measures the time elapsed after such a permissible condition has been satisfied, there may advantageously be introduced a process to permit the compressor 51 to be turned on only after the lapse time has exceeded a predetermined time period (approx. 3 seconds for example).

As described, in the control system 100 according to the present invention, an accelerating state of the vehicle is checked by computing the gear ratio e of the torque converter 2 to thereby define whether the torque converter 2 is in the torque converting region or simply in the fluid coupling region, which in turn defines whether or not the the vehicle is substantially put in the accelerating state. When the accelerating state of the vehicle is thus confirmed, the compressor 51 of the cooling-oriented air conditioner is stopped. As a result, the power of the engine 1 is substantially consumed for nothing but as energy for acceleration, thereby effectively securing the inherent capacity of acceleration of the vehicle.

Further, according to the embodiment, in the control system 100 having besides various original functions thereof a distinct function to govern the conditioner circuit 41 and particularly for the operation control of the compressor 51, this additional function is achieved by simple provision of processes of steps 64 to 74 shown in FIG. 5, which implies the possibility of applying the present invention to "a voluntary existing control system to govern an automatic transmission and an air conditioner" in a facile and inexpensive manner. In this respect, in the control system 100, the steps 69 and 72, where the instantaneous throttle opening Thd is compared with the first reference opening $Th_1$ and the second reference opening $Th_2$, respectively, to check for the accelerating state of the vehicle with raised accuracy.

Still more, in the control system 100, for practical purposes, the control circuit 31 may advantageously be constituted with a micro-computer system consisting of a central processing unit and various necessary integrated circuits to cooperate therewith.

Further more, the revolution number No of the output shaft 3 of the torque converter 2 may advantageously be directly detected with a sensor for exclusive use.

Yet more, in the flow chart of FIG. 5, particularly in the routine of steps 64 to 74, where the first and the second predetermined gear ratios $e_1$, $e_2$ are set as values near the coupling point $e_c$, there may advantageously be employed a setting such that $e_1 = e_2 = e_c$, like a belowdescribed first modified example of the present embodiment. Likewise, with respect to the first and the second reference openings $Th_1$, $Th_2$, such a setting also may advantageously be employed that $Th_1 = Th_2$.

Figure 6:
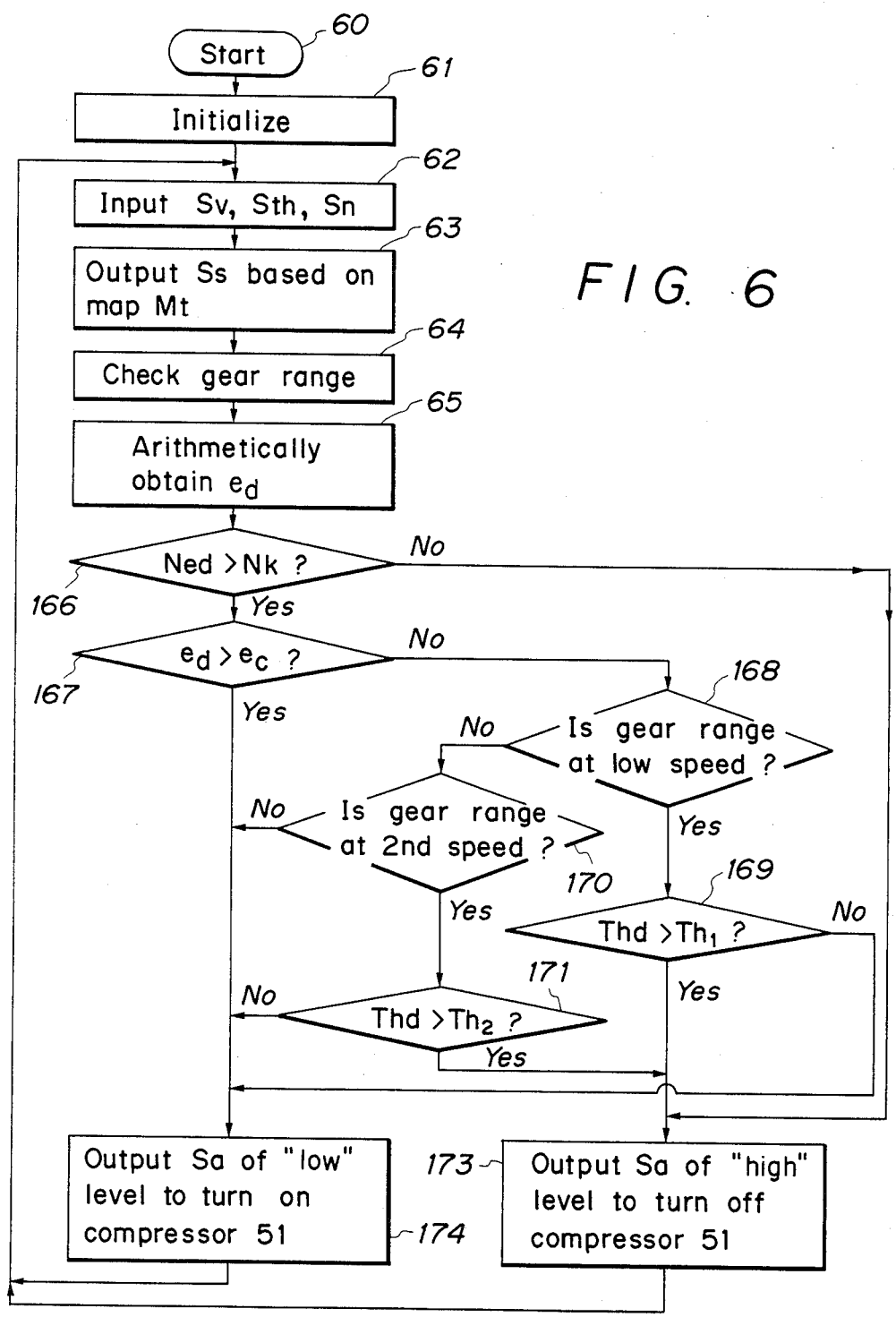
FIG. 6 is a flow chart showing the content of control actions according to a first modified example of the control system.

Referring now to FIG. 6, there will be described below the first modified example of the embodiment, in which for the gear ratio e of the converter 2 there is employed a setting such that $e_1 = e_2 = e_c$. Like steps of processing are designated by like reference numerals in conjunction with the flow chart of FIG. 5, and hence the repetition of corresponding description is omitted.

In the first modified example, for the control of the air conditioner, there is employed a loop consisting of steps 64, 65 and 166 to 174. The contents of respective processes associated with steps 64, 65 and 166 to 174 are easily comprehensible in view of steps 64 to 74 of the flow chart of FIG. 5, and associated description will be made in a simplified manner.

At step 166, the instantaneous engine revolution number Ned is compared with the reference revolution number Nk to thereby determined whether or not the former is larger than the latter. If Ned is not larger than Nk, the program flow goes to the stage 173 to turn off the compressor 51.

If, at step 166, Ned is determined to be larger than Nk, the program flow goes to step 167, where it is determined whether or not the instantaneous gear ratio $e_d$ of the torque converter 2 is higher than the coupling point $e_c$. If $e_d$ is higher than $e_c$, the program flow goes to step 174 to turn on the compressor 51.

If, at step 167, $e_d$ is determined not to be higher than $e_c$, a group of processes are to be made at steps 168 to 171 in a cooperating manner so as to turn off the compressor 51, if the current gear range of the automatic transmission 10 is determined to be low, only under a condition that the instantaneous throttle opening Thd is larger than the first reference opening $Th_1$. The current gear range is determined to be second, only under a condition that the instantaneous throttle opening Thd is larger than the second reference opening $Th_2$.

If neither of such conditions is satisfied, the program flow goes to step 174 to turn on the compressor 51.

Referring now to FIG. 7, there will be described below a second modified example of the present embodiment, in which an automatic transmission 10 that is not electronically controlled is employed. In this example, therefore, if the compressor 51 is desired to be stopped only when accelerating the vehicle with a gear range set at "low" or "first", no more than a gear ratio of low range is required in the computation to determine the revolution number No of the output shaft 3 of the torque converter 2 from the instantaneous vehicle speed Vd, and there is preferably employed a flow chart of FIG. 7 to perform associated control, where like steps are designated by like reference characters in relation to the flow chart of FIG. 5.

In the second modified example, at step 266, it is determined whether or not Ned>Nk. If not, a "high" level signal is output at step 273. If Ned>Nk, then at step 267 it is determined whether or not $e_d < e_c$, and if not, a "low" level signal is output at step 274. If $e_d < e_c$, then at step 268 it is determined whether or not Thd>Thr, and if not, the low level signal is to be output, but if Thd>Thr, the high level signal is output.

As a result, at or above a "second" range of speed, where the instantaneous gear ratio $e_d$ is extremely large and its value exceeds the unit, the compressor 51 is subtantially permitted to be kept in operation even in the accelerating state of the vehicle.

Therefore, according to the second modified example of FIG. 7, in which most of associated purposes may well be sufficed by taking the low gear range as the object, if the cooling is desired to be ceased in the low range only, there can be achieved an expensive system without the need of checking the gear range.

In the control system 100 according to the embodiment, the forward gear range of the automatic transmission 10 is two-staged to be low and second. In this respect, the gear range of such a transmission may advantageously be three or four staged.

Moreover, in the control system 100, the compressor 51 of the cooling-oriented air conditioner is taken as an example of engine-driven auxiliary equipment for vehicles. In this respect, such object of a control system according to the present invention may be a voluntary auxiliary equipment for vehicles that is usually driven by an engine of the vehicle and, even when its operation is interrupted, will not have any substantial effects on various necessary characterics of the vehicle.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

What is claimed is:

1. A control system for an engine-driven auxiliary equipment for a vehicle comprising:
   an engine;
   an automatic transmission receiving power from said engine to drive a driven wheel;
   said automatic transmission consisting of a torque converter of a fluid coupling type having an input shaft thereof at the engine side and an output shaft thereof at the driven wheel side, said automatic transmission having a plurality of gear ranges;
   said auxiliary equipment being driven with power from said engine;
   transmitting-and-interrupting means for transmitting and interrupting the power from said engine to said auxiliary equipment, said control system for controlling said transmitting-and-interrupting means to thereby control said auxiliary equipment;
   first means for determining if said vehicle is in an accelerating state by determining an instantaneous value of a rotational speed ratio of said torque converter in terms of a rotation speed of said output shaft at the driven wheel side of said torque converter divided by a rotation speed of said input shaft at the engine side thereof;
   second means for interrupting the power from said engine to said auxiliary equipment by said transmitting-and-interrupting means when said vehicle is in said accelerating state under a condition that said instantaneous value of said rotational speed ratio as thus determined of said torque converter is lying in a region where a predetermined value of torque amplification, of said torque converter, is exceeded indicating said accelerating state;
   a central control circuit;
   vehicle speed detecting means for feeding said control circuit with a signal representative of an instantaneous value of a vehicle speed;
   engine throttle opening detecting means for feeding said control circuit with a signal representative of an instantaneous value of an engine throttle opening;
   a shift map for said automatic transmission; and
   said shift map having as parameters thereof, said vehicle speed and said engine throttle opening; and
   said control circuit for controlling the shifting of said automatic transmission in conformity with said shift map.

2. A control system according to claim 1, wherein:
   said first means comprises:
   said control circuit;
   said vehicle speed detecting means; and
   engine revolution number detecting means for feeding said control circuit with a signal representative of an instantaneous value of an engine revolution number of said engine; and
   said control circuit determines said instantaneous value of said rotational speed ratio of said torque converter, on the basis of:
   a current gear range of said automatic transmission, as it is determined depending on said shift map;
   said instantaneous value of said vehicle speed, as it is represented by said signal from said vehicle speed detecting means; and
   said instantaneous value of said revolution number of said engine, as it is represented by said signal from said engine revolution number detecting means.

3. A control system according to claim 2, wherein:
   said signal from said engine throttle opening detecting means comprises a throttle opening signal representing an instantaneous value of a throttle opening;
   said second means comprises said control circuit; and
   said second means interrupts said transmitting-and-interrupting means to interrupt the power from said engine to said auxiliary equipment under conditions to be satisfied wherein
   said instantaneous value of said rotational speed ratio of said torque converter is lying in said region corresponding to said exceeded predetermined value of torque amplification of said torque converter; and
   said instantaneous value of said throttle opening is lying in a region where a predetermined value of a state of acceleration is exceeded.

4. A control according to claim 1, wherein:
   said auxiliary equipment comprises a compressor of an air conditioner for cooling use.

* * * * *

UNITED STATES PATENT AND TRADEMARK OFFICE
CERTIFICATE OF CORRECTION

PATENT NO. : 4,730,520

DATED : March 15, 1988

INVENTOR(S) : Masao NISHIKAWA et al

It is certified that error appears in the above-identified patent and that said Letters Patent is hereby corrected as shown below:

On the cover page, Item [63], "Pat. No. 4,658,943" should read --Abandoned--.

Signed and Sealed this

Fourth Day of October, 1988

*Attest:*

DONALD J. QUIGG

*Attesting Officer*  *Commissioner of Patents and Trademarks*